June 18, 1963
J. B. SISSON
3,094,449
METHOD OF FORMING A CONTAINER FROM A FLEXIBLE
LAMINATE OF FOAMED POLYSTYRENE
Original Filed April 30, 1956
4 Sheets-Sheet 1
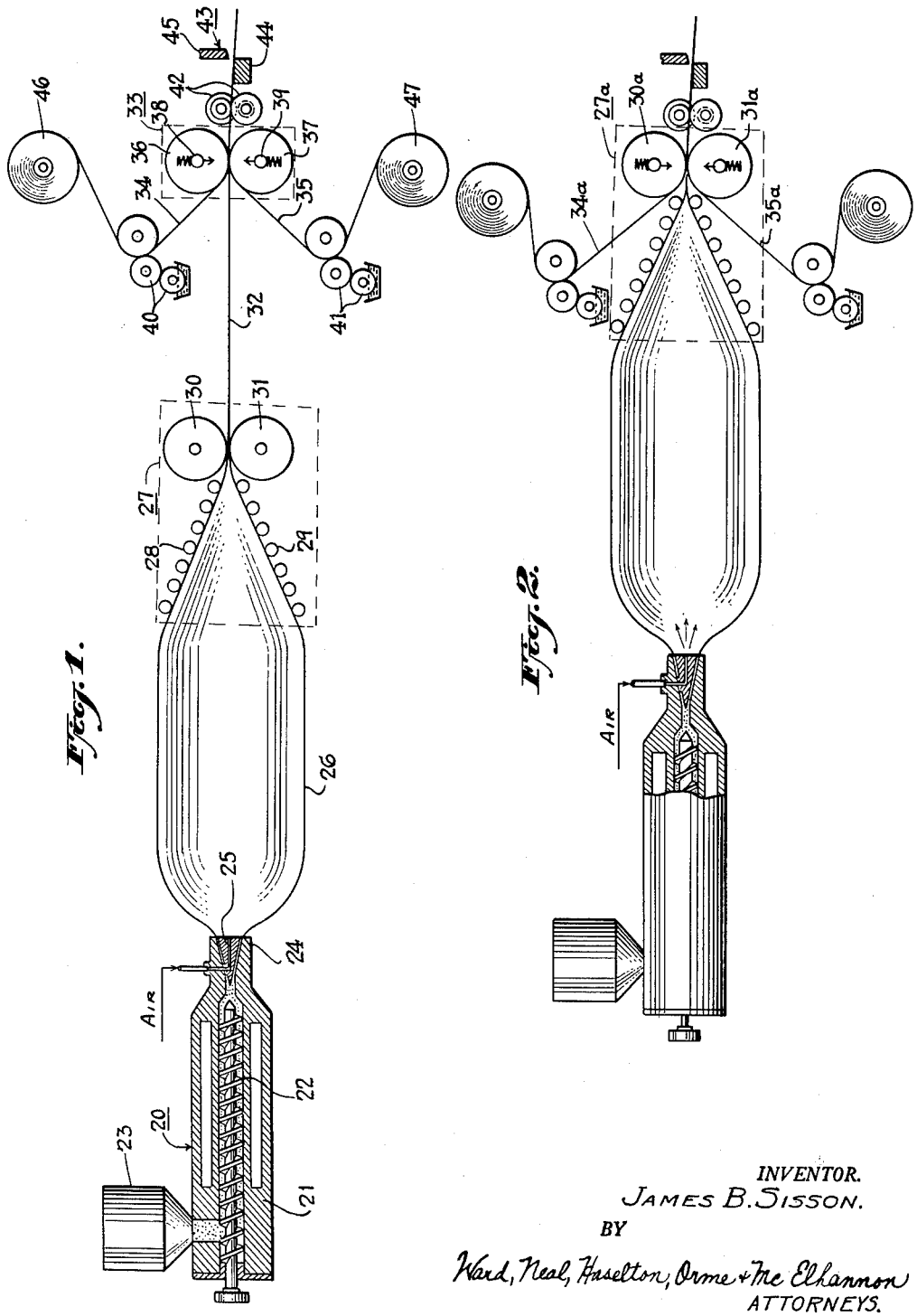
INVENTOR.
JAMES B. SISSON.
BY
Ward, Neal, Haselton, Orme + Mc Elhannon
ATTORNEYS.

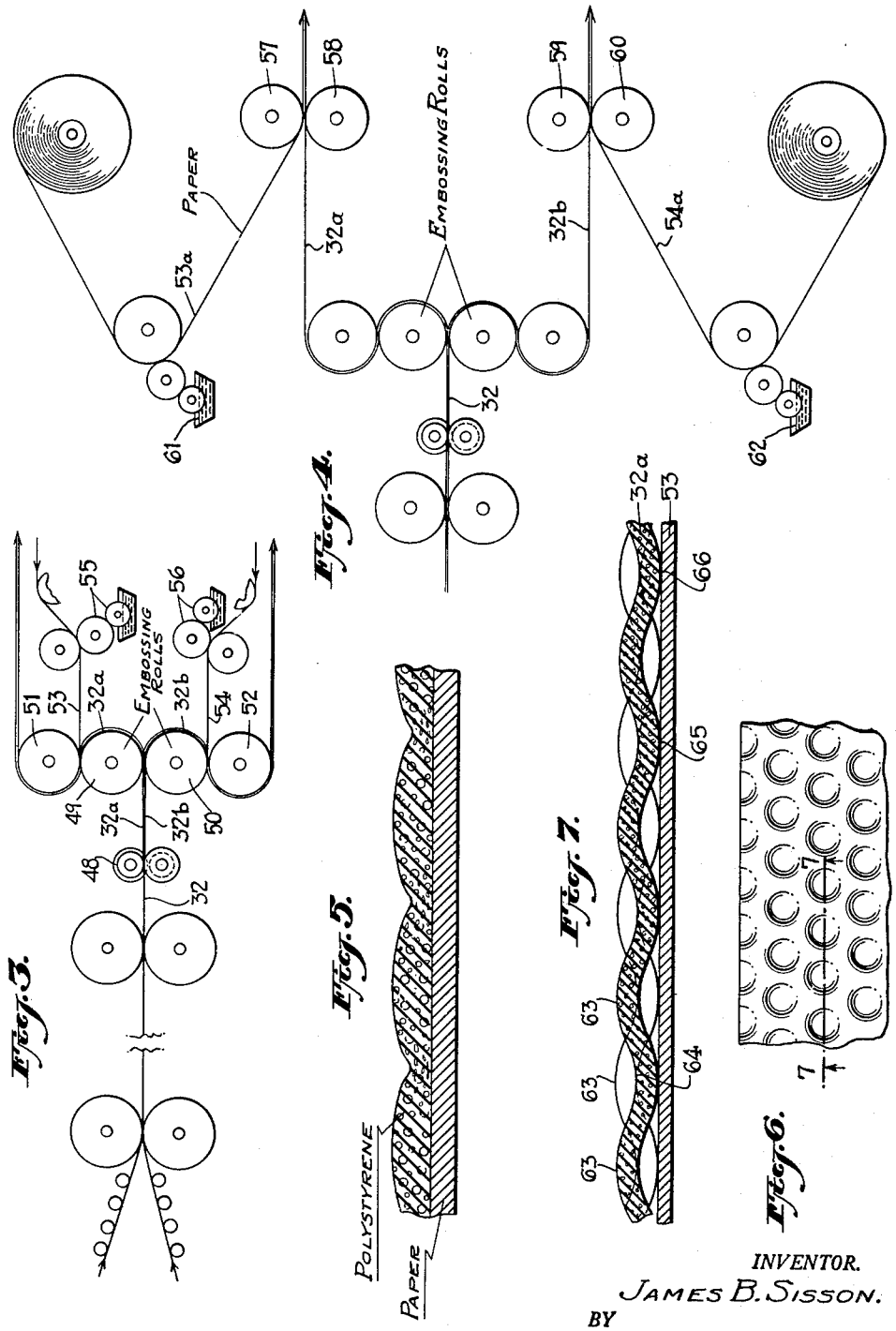

June 18, 1963   J. B. SISSON   3,094,449
METHOD OF FORMING A CONTAINER FROM A FLEXIBLE
LAMINATE OF FOAMED POLYSTYRENE
Original Filed April 30, 1956   4 Sheets-Sheet 3
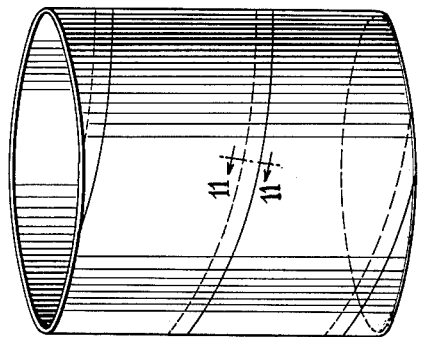
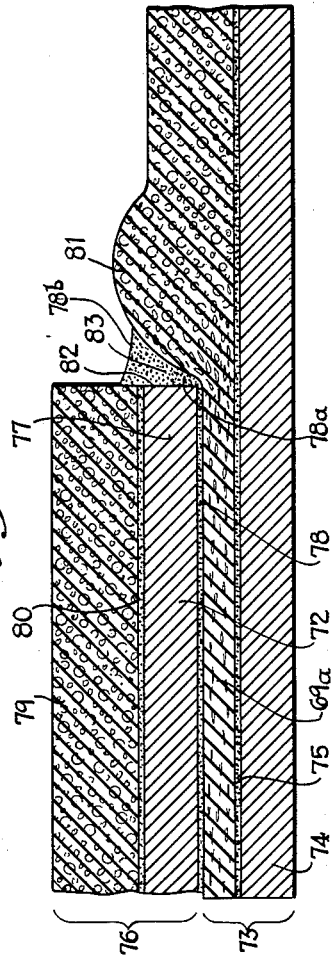
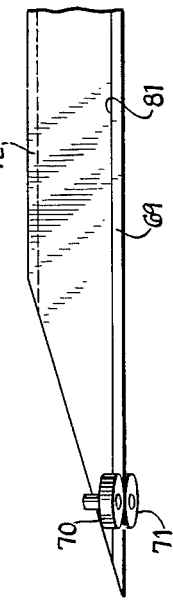
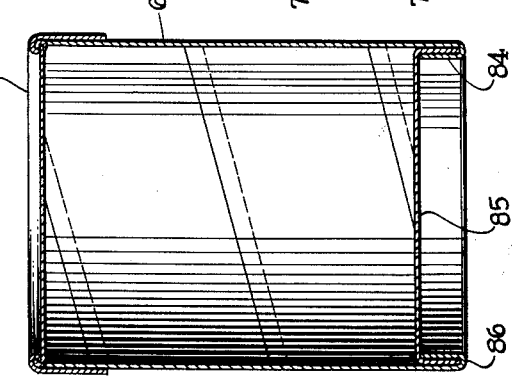
INVENTOR.
JAMES B. SISSON.
BY
Ward, Neal, Haselton, Orme + McElhannon
ATTORNEYS.

June 18, 1963 J. B. SISSON 3,094,449
METHOD OF FORMING A CONTAINER FROM A FLEXIBLE
LAMINATE OF FOAMED POLYSTYRENE
Original Filed April 30, 1956 4 Sheets-Sheet 4
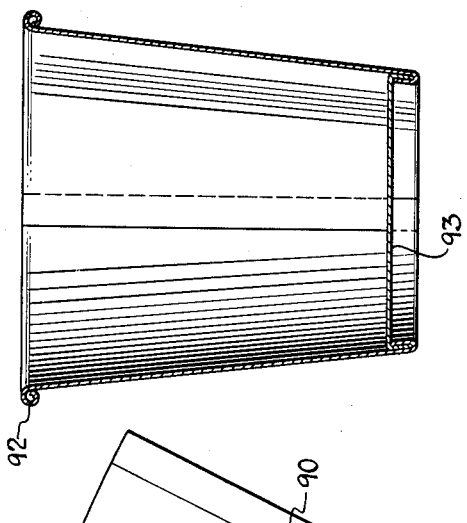
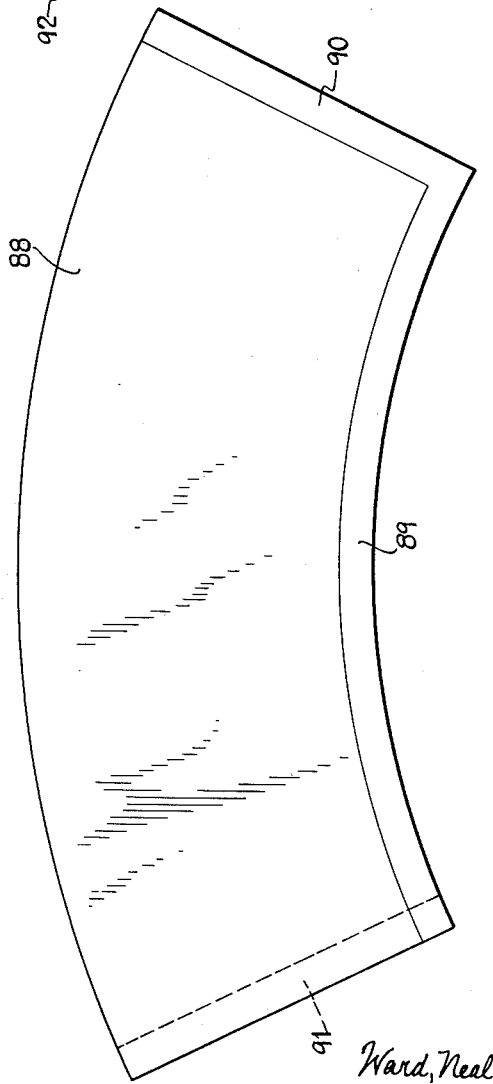
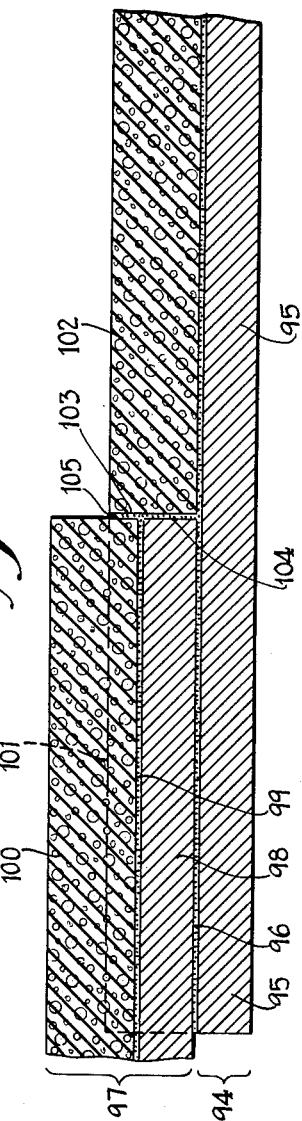
INVENTOR.
JAMES B. SISSON.
BY
Ward, Neal, Haselton, Orme + McElhannon
ATTORNEYS.

3,094,449
METHOD OF FORMING A CONTAINER FROM A FLEXIBLE LAMINATE OF FOAMED POLYSTYRENE
James B. Sisson, Carthage, N.Y., assignor to St. Regis Paper Company, New York, N.Y., a corporation of New York
Original application Apr. 30, 1956, Ser. No. 581,430, now Patent No. 2,917,217, dated Dec. 15, 1959. Divided and this application Aug. 10, 1959, Ser. No. 837,564
11 Claims. (Cl. 156—184)

This invention relates to laminated sheet material and to methods and apparatus for forming such material. The invention further relates to such material consisting of combined laminae of foamed polystyrene and paper, to novel container constructions formed from such laminated sheet material, and to novel methods for manufacturing same.

The invention, among many other uses, is particularly well adapted for providing a container construction for hot drinks, such container being of the disposable type which can be manufactured inexpensively and in commercially competitive form. The novel laminate for this purpose consists of a flexible foamed polystyrene sheet adhered to a flexible paper sheet, the polystyrene sheet having a substantially continuous and integral skin on both sides thereof and containing throughout and between such skins on opposite sides thereof a multitude of small closed cells. Such polystyrene sheet is formed by extruding foamable polystyrene in the form of a seamless inflated tube, flattening the latter and adhering the paper sheet to the polystyrene sheet formed with such seamless tube. A container formed from this laminate and with the polystyrene side thereof facing interiorly of the container permits the use of a thinner paper than would otherwise be required, for example for containing hot drinks, because of the insulating and waterproof characteristics of the polystyrene which prevents the wetting of the outer layer of paper and reduces the heat which otherwise would be communicated thereto. The extremely light insulation layer of polystyrene bonded to the paper gives adequate strength and rigidity to such thinner paper, there being a mutual strengthening by both of the components of the laminate. Consequently, the cost of the paper is reduced as compared to that which otherwise might be required for this purpose.

Thus the protective character of the polystyrene makes it unnecessary for the paper to be sufficiently strong to resist the full effect of the heat of the hot drink thereupon as was heretofore the case and such polystyrene also makes it unnecessary for the paper to resist the effect of wetting. Better insulating qualities are obtained since dry paper is a better heat insulator than wet paper.

Also the aforedescribed laminate with the polystyrene forming the interior face of such a container prevents the flavor of a hot drink from being changed by the paper and thus prevents the drink from absorbing so-called "paper flavor." The polystyrene, due to its inert nature, will not change the flavor of foodstuffs including food liquids.

The novel laminate, as aforementioned, is formed by extruding through a nozzle at an extruding zone foamable polystyrene in the form of a seamless tube, which tube is stretched and inflated by a selected volume of gas therein. At a collapsing zone the tube is collapsed into flattened sheet form, the selected volume of gas being situated between the extrusion and collapsing zones. While so collapsing the tube, a continuous flexible web of paper is bonded, for example, adhesively applied to at least one side thereof and such collapsed seamless tube can be cut longitudinally to separate the sides thereof either before or after the application of the paper web. The combining of the flexible paper web with the sheet of polystyrene is effected by application of selected pressure which will not unduly crush the multitude of closed cells but will cause smooth adherence of the laminae.

I have found surprisingly that the polystyrene side of the finished laminate can be formed, in the absence of a deliberate embossing thereof, with the appearance of embossing somewhat similar to certain types of leather but with considerably greater softness, the surface being shiny and exhibiting a diffused sheen. Despite this, if desired, the laminate can be deliberately embossed by the application of embossing pressures thereby to obtain preselected and novel embossing effects.

Further I have found that the novel laminate possesses high printability despite any hills and valleys thereof which may or may not be the result of deliberate embossing, this being true by virtue of the particular degree of recovery or particular resiliency of the foamed polystyrene which is unusually well adapted for half-tone printing by virtue of the fact that the application of the printing plates thereto under printing pressure causes the hills to be reduced temporarily in altitude at least to the level of the valleys whereby an equal application of the printing ink is made over all the surfaces regardless of relative height from a selected base. Also, in the opinion of those skilled in printing, a third dimensional or depth effect is obtained in printing same, particularly in half-tone printing, which apparently is due to the inner porosity of the polystyrene and its shiny surface, such inner porosity effecting the skin surface.

I have found that an infinite color shading of such sheets can be obtained by dry blending oil soluble dyes with the foamable beads of polystyrene before extruding the mixture.

Also, containers may be made from the novel laminate having an exterior surface of the foamed polystyrene, which surface is cushioned, non-slip, bright, pleasant to the touch and which container is well adapted for drinking use by virtue of its low heat conductivity in that it will conduct little or no heat away from the hands or lips and hence produces a feeling of warmth to the touch.

Also I have found by virtue of the better insulating qualities of a container of this nature, that there is no need to provide a handle for same as in the case of disposable hot drink containers heretofore suggested, such as those for hot coffee.

The prior art has failed to suggest an entirely satisfactory laminate which is well adapted for use in insulated containers for liquids, such as hot drinks or frozen foods, one of the reasons being the relatively high cost of materials heretofore suggested for this purpose.

Also, no suitable laminate has been suggested in the past having the qualities of high insulation, bright reflective sheen finish, resistance to stain, as caused by foods, high printability in an embossed or unembossed condition, waterproofness and non-abrasiveness.

One of the objects of the present invention is to overcome the above disadvantages or to reduce same to insignificance.

The invention in one aspect thereof comprises a novel flexible laminate constituted by an extruded, stretched, ballooned and flattened tube of flexible foamed polystyrene formed into a flattened sheet several thousandths of an inch thick containing a multitude of closed cells and having a substantially continuous integral skin showing a diffused sheen, one side of said sheet being bonded by adhesive to a flexible sheet of paper.

The invention in another aspect thereof comprises a container formed from the aforementioned novel laminate, the latter having selected marginal surfaces on one side thereof overlapping and secured adhesively to selected marginal surfaces on the other side thereof to form the container, the cells of the foamed polystyrene in those selected marginal surfaces being collapsed, such selected surfaces being in engagement with the selected marginal surfaces on the other side of the laminate which are of paper.

The invention in another aspect thereof comprises a container as set forth in the preceding paragraph and wherein the polystyrene side of said laminate forms the interior surface of the container.

The invention in a still further aspect thereof comprises the method for forming the aforementioned novel laminated article of foamed polystyrene flexible sheet material adhered to a sheet of flexible paper, which method consists in extruding foamable polystyrene through a nozzle continuously to form a seamless tube inflated by a selected volume of gas within such tube, collapsing the inflated tube continuously at a squeeze zone thereby to bring into engagement opposite interior surfaces of such tube, such selected volume of gas being located between the extrusion and squeeze zones. The collapsing of the seamless tube thereby forms two adjacent sheets of the flexible foamed polystyrene material, which sheets are joined along their sides. Each of said adjacent sheets, as aforementioned, is several thousandths of an inch thick and contains throughout a multitude of closed cells. A continuous integral skin exists on both sides thereof between which the aforementioned multitude of closed cells are located. While so collapsing the seamless tube and to at least one side of the collapsed portion thereof there is continuously and adhesively applied a flexible paper web at a combining zone and by the application of pressure which urges together the paper web and the sheet of polystyrene, the pressure being selected to effect a bond without crushing the closed cells of the foamed polystyrene. The sides of the collapsed seamless tube are separated as by cutting apart either before or after the application of the paper web to one of said sheets of polystyrene.

Further objects, features and advantages of the present invention will appear from the detailed description given below taken in connection with the accompanying drawings which form a part of this specification and illustrate, by way of example, certain preferred embodiments of the invention, it being understood that the latter is not limited by such drawings, reference for this latter purpose being had to the appended claims.

In the drawings:

FIG. 1 is a side view, partly in section and with parts broken away, illustrating schematically an apparatus for carrying out one form of the present invention;

FIG. 2 is another side view, partly in section and with parts broken away, illustrating also schematically an apparatus partly similar to that shown in FIG. 1 but embodying a modification thereof;

FIG. 3 is a side elevation schematically indicating a still further modification of the apparatus of FIG. 1 and showing a different manner of applying continuously paper webs to the sheet of polystyrene;

FIG. 4 is a side elevation illustrating a still further modification of the apparatus of FIG. 1 and showing another manner of applying continuously a paper web to the polystyrene;

FIG. 5 is a fragmentary cross-sectional view of a laminate embodying one form of the present invention shown upon a greatly enlarged scale and illustrating one form of the embossing of the foamed polystyrene sheet;

FIG. 6 is a top plan view of an enlarged scale of another form of the novel laminate indicating a different embossing of the polystyrene sheet thereof;

FIG. 7 is a sectional view taken substantially along line 7—7 of FIG. 7 but on a greatly enlarged scale with respect to FIG. 6;

FIG. 8 is a plan view of a "container blank" or strip of the novel laminate which has been prepared for winding into a container or an element of a container;

FIG. 9 is a perspective view of a cylinder which is formed by helically winding the strip shown in FIG. 8;

FIG. 10 is a vertical cross-sectional view of a container employing the cylinder shown in FIG. 9;

FIG. 11 is a sectional view on a greatly enlarged scale taken substantially along line 11—11 of FIG. 9 and showing a novel seam construction;

FIG. 11a shows a modification of the seam construction of FIG. 11;

FIG. 12 is a plan view of another "container blank" formed from the novel laminate; and FIG. 13 is a vertical sectional view of a container formed from the blank shown in FIG. 12.

Referring to the drawings in greater detail, with particular reference to FIG. 1, there is shown an apparatus for carrying out one form of the novel method for forming the novel laminate. The apparatus comprises an extruder element 20 of well known construction comprising a barrel 21 within which there is rotatably mounted an extruder screw 22 which is driven by suitable power means not shown and which receives at its left-hand extremity the foamable polystyrene which is placed in a hopper 23. The polystyrene is extruded through an extruder nozzle 24 which, in the form shown, has an orifice of annular configuration. A central conduit 25 is employed for a purpose to be mentioned below. Heat is applied to selected portions of the extruder element 20. The extruder screw 22, as a result of being turned, and with the aid of such heat, urges by extrusion the foamable polystyrene through the nozzle 24 in the form of a seamless tube 26 into which there is directed gas under pressure, such as air, via the passage 25 for the purpose of stretching and inflating the tube 26 so that it is ballooned to a selected diameter. Such stretching occurs extremely rapidly both longitudinally and circumferentially and thus is bidirectional.

The thickness of the foamed polystyrene sheet thus formed will normally vary between .005" and .060" but may be up to 0.125" if necessary. The multitude of closed cells normally vary in diameter between .002" and .006".

The seamless tube 26 is continuously directed to a collapsing unit 27 where it is progressively flattened by means of the sets of rollers 28 and 29 which progressively bring the opposite sides together and direct same into the nip of a pair of squeeze rolls 30, 31 which completes the flattening of the tube 26 and from which the now flattened polystyrene double web 32 is directed toward a combining unit 33 where there are continuously applied to the opposite faces of such web 32 a pair of continuous paper webs 34 and 35, respectively. For this purpose the web 32 and the webs 34 and 35 are directed into the nip of a pair of combining rolls 36 and 37 which combine with the aid of adhesive each of the webs to its respective polystyrene surface. The squeeze rolls 30, 31 and combining rolls 36 and 37 are urged together by a preselected force or pressure which will effect respectively a suitable collapsing of the tube 26 and a suitable adhesion between the several layers but which will not unduly crush any of the multitude of cells in the polystyrene. The combining rolls 36 and 37 respectively are mounted upon shafts 38 and 39. I have found it advantageous to urge such shafts toward one another resiliently with a force equal to approximately one-half pound per inch of the width of the paper web. In order to effect the bond between the polystyrene web 32 and the paper webs 34 and 35, adhesive is applied, for example, to the inner faces of the webs 34 and 35, respectively, by means of adhesive applicators 40 and 41. If desired, such adhesive can be applied to the web 32 instead of to webs 34, 35. The adhesive advantageously is a synthetic resin having a polyvinyl acetate base.

There is thus formed a double layer of the novel laminate consisting of the web 32 comprising the flattened foamed polystyrene tube joined along its opposite edges and bearing on its opposite outer faces the aforementioned webs 34 and 35 which preferably are of paper but can be of other suitable sheet material. Such two adjacent thicknesses of the novel laminate are made separable by any suitable means, such as by a pair of slitters located respectively on opposite sides of the flattened tube for cutting such opposite sides, one of such slitters being shown at 42.

If desired, the double thickness of the novel laminate can be cut into any desired lengths by means of a cutter 43 consisting of an anvil 44 and a reciprocating cutter 45.

It will be noted that the paper webs 34 and 35 are drawn respectively from source rolls 46 and 47, respectively.

During the initial stage of the extruding of the seamless tube 26, air or other gas under pressure is directed therein via the passage 25 while the tube progresses toward the collapsing unit 27. After the initial edges of such tube have been collapsed by the collapsing unit 27, the air under pressure from the passage 25 should be shut off to avoid rupturing the seamless tube. Alternatively, air can be directed continuously into the tube providing it is withdrawn at a comparable rate thereby to avoid rupturing of the tube. If desired, a cooling gas can be so directed continuously into the seamless tube and continuously withdrawn via another passage (not shown).

In FIG. 2, the apparatus and the method performed are identical with that of FIG. 1 with the exception that paper webs 34a and 35a, analogous respectively to the webs 34 and 35 of FIG. 1, are applied to the web 32 at squeeze zone 27a and thus are directed on opposite sides of said web into the nip of a pair of squeeze rolls 30a and 31a, analogous to rolls 30, 31 of FIG. 1. The squeeze rolls 30a and 31a thus serve the dual function of collapsing the tube and pressing the paper webs upon opposite faces thereof, it being understood that suitable resilient means are employed for urging same together which are analogous to those employed for combining rolls 36 and 37.

Referring now to FIG. 3, in lieu of so applying the paper webs, as shown in FIGS. 1 and 2, the web 32 comprising the continuous collapsed polystyrene seamless tube in advance is separated into two polystyrene webs, as by a pair of slitters situated on opposite edges thereof, one of which is shown at 48, thereby forming the two separate polystyrene webs 32a and 32b which are directed into the nip between peripherally engaged rolls 49 and 50 which, if desired, can have embossed surfaces for the purpose of acting upon the two webs with suitable embossing pressure to produce, for example, an embossing such as that shown in FIGS. 6 and 7. However, the rolls 49 and 50, if desired, can be free of such embossing.

The separate polystyrene webs 32a and 32b, after being directed between rolls 49 and 50, are directed around the righthand half thereof, as viewed in FIG. 3, and thence respectively around the lefthand half of rolls 51 and 52 which are respectively urged against the rolls 49 and 50. The axes of the rolls 49, 50 and 51, 52 are preferably in alignment, as shown in FIG. 3. Paper webs 53 and 54 are respectively applied to the surfaces of webs 32a and 32b which formerly comprised the inside of the tube 26, this being accomplished by directing such paper webs 53 and 54, respectively, into the nips between the roll pairs 49, 51 and 50, 52. Adhesive is applied to the pertinent surfaces of the webs 53, 54 by means of adhesive applicators 55, 56.

The rolls 49, 50, if conformed as embossing rolls with suitable embossed surfaces, if desired, can have heat applied thereto for the purpose of assisting in forming the embossing of the polystyrene webs 32a and 32b.

Whereas in FIG. 3 the paper webs 53 and 54 are applied to the surfaces of the polystyrene webs which were located inside the tube 26, the apparatus shown in FIG. 4, is similar to that of FIG. 3 except that it is designed for applying paper webs 53a and 54a to the surfaces of the polystyrene which formerly comprised the outer surface of such seamless tube 26. Accordingly, a pair of combining rolls 57, 58 are provided for webs 53a and 32a, such combining rolls being situated to urge together the webs wherein the paper web is situated exteriorly of the web 32a as viewed in FIG. 4. Analogously, a pair of combining rolls 59 and 60 are provided for combining the webs 32b and 54a. Adhesive applicators 61 and 62 respectively apply adhesive to the webs 53a and 54a.

Referring now to FIG. 5, I have found that the novel laminate can be embossed or corrugated in such a manner that the polystyrene and not the paper lamination contains the embossing. This is accomplished by subjecting the novel laminate to embossing rolls wherein the principal embossed surfaces thereof are formed on the rolls which contact only the polystyrene side thereof, the other roll comprising a backup roll for the embossing roll being in engagement with the paper side of the laminate. Thus the polystyrene layer can be embossed without embossing the paper layer. This can be accomplished, for example, by embossing the roll 58 (FIG. 4) and employing a smooth surface upon the roll 57.

Referring to FIGS. 6 and 7, where a more pronounced type of cushion or corrugated construction is desired, a more pronounced cushion type of embossing of the polystyrene layer is effected, the other layer being free of embossing. Under these circumstances I have found it advantageous, as aforementioned, to emboss the polystyrene sheet prior to combining same with the paper as by conforming the surfaces of rolls 49 and 50 to produce the embossing. By so embossing the polystyrene layer prior to combining same with the paper, a plurality of mounds 63 can be formed separated by valleys, such as 64. The polystyrene sheet, for example, 32a (FIG. 7), is in engagement with the paper web 53 at the under portions of the valleys 64, for example, in the areas 65 and 66, the higher portions of the under surface of the web 32a being out of engagement with the paper web 53 thereby insuring the formation of a laminate having cushion-like characteristics which are adapted for certain uses, such as forming interleaves for the shipping of plate glass.

Referring now to FIGS. 8, 9 and 10, the formation of a novel container embodying one form of the present invention will now be described. The principal element of a container which is formed as shown in these figures comprises cylinder 67 which is formed by helically winding a strip 68 formed of the novel laminate. The strip 68 formed from the novel laminate is fabricated in accordance with any of the methods and by any of the apparatus heretofore described and consists of an elongated ribbon-like piece having the ends thereof tapered in a well known manner to adapt same for the formation of the cylinder 67.

For the purpose of forming a novel seam for such cylindrical container element 67, I have found it advantageous specially to prepare a margin 69 of the strip 68 whereby the seam in FIG. 11 is produced as a result of helically winding the strip 68 and adhering the marginal portions thereof as will be described herebelow. Thus I have found it advantageous to collapse the multitude of small closed cells along selected marginal surfaces of the strip 68 for the purpose of forming there solid polystyrene thereby increasing the strength of the internal structure of the polystyrene. The foamed polystyrene having the multitude of discrete closed cells is relatively not so strong for adhesion purposes as such fused solid polystyrene. Consequently, after such strip 68 is formed, a selected margin, such as 69, is passed between heated rolls 70 and 71 which thereby apply heat and pressure to collapse the small closed cavities in the polystyrene of such margin 69 and to fuse the polystyrene into a thin solid ribbon-like mass.

Thereafter the strip is wound helically into the cylindrical configuration shown in FIG. 9 with the polystyrene side of the strip facing interiorly and wherein the solid or fused polystyrene margin 69a is adhesively secured to the paper side of the strip 68 along an opposite marginal portion 72 located on the opposite side of the strip with respect to the polystyrene side, it being understood that adhesive is applied to one or the other of the facing marginal portions 69a or 72 prior to the winding of the strip into the cylinder 67.

Thus referring again to FIG. 11, a novel seam is formed consisting of a marginal thickness 73 of the laminate consisting of a layer of paper 74 bonded by a layer of adhesive 75 to the solid polystyrene margin 69a. Such seam is further composed of the thickness 76 of the laminate having a layer of paper 77 bonded to the solid polystyrene margin 69a by means of adhesive layer 78, the thickness 76 also including layer 79 of foamed and uncollapsed polystyrene which is secured to the paper layer 77 by an adhesive layer 80 therebetween. If desired, the layer 79 along the margin can be collapsed to reduce the bulk of the seam but this is not necessary to enhance the strength of the bond between thicknesses 73 and 76.

I have found that the application of heat and pressure, as by the heated rolls 70, 71 to the strip margin 69 forms a bead 81 along the inner edge of the solid polystyrene margin 69a, which bead serves the purpose of forming a well defined boundary for accurately positioning the edge 82 of the paper margin 72 in the formation of the seam of FIG. 11. Furthermore, the bead 81 assists in the sealing of the seam by forming with edge 82 a well defined trough 83.

I have found that advantageous conditions for collapsing or fusing the polystyrene of the margin include the application of heat in excess of 250° F. and application of pressure in excess of one pound per inch of heated roll width. Preferably the heated rolls are coated with an adhesive repellent material such as polytetrafluoroethylene. The novel seam, in one form thereof, may be formed without any or any appreciable amount of adhesive in the trough 83. Alternatively in another form, adhesive 78a up to the level 78b may be deposited or caused to collect in the trough 83. The adhesive, up to level 78b, thus entirely bridges the gap between the polystyrene bead 81 and the polystyrene layer 79 and hence prevents the contents of the container from contacting the edge 82 of the paper layer 77. Where the adhesive employed is waterproof or water-repellent there is thus provided a seam construction of special advantages in view of the waterproof character of the polystyrene, because the interior of a container having such a seam is entirely faced with waterproof material. Normally such a waterproof or water-repellent adhesive is employed as above suggested. The seam of FIG. 11 with or without the adhesive 78a in the trough 83 is of substantial structural strength. Also, even if formed without such adhesive 78a such seam is for most purposes substantially waterproof or liquid-tight, depending of course on the liquid absorptive qualities of the paper layer 77 and the area of the exposed edge 82.

The cylinder 67 can be completed thereby forming a container by inwardly rolling the bottom edges thereof in a well known manner to form an in-rolled portion 84 thereby to hold in position a bottom-forming disk 85 having a skirt flange 86 which is held between the outer surface of the cylinder 67 and the in-rolled portion 84. The bottom-forming disk 85 preferably is composed of the novel laminate and is positioned with the polystrene side thereof facing interiorly of the container.

It is, of course, possible to form the container of FIG. 10 with the polystyrene side of the novel laminate facing outwardly instead of inwardly, in a separate and non-analogous form of the invention.

A container top 87 also formed of the novel laminate may be provided for the container of FIG. 10.

The novel laminate also can be formed in many other shapes for the purpose of forming boxes or other types of containers. Referring to FIGS. 12 and 13, another example of a container is shown formed from the novel laminate, a so-called cup blank 88 comprising a section of an annular flat disk being adapted for the formation of the container shown in FIG. 13. The marginal portions 89 and 90 are prepared in a manner similar to that described above in connection with FIG. 11, that is, the multitudinous cavities in the foamed polystyrene are collapsed and the cup blank 88 is rolled or wound into a convolute-like conformation shown in FIG. 13 wherein margin 90 containing the collapsed polystyrene is moved into overlapping relation with the paper side of the blank along a marginal portion 91 (FIG. 12) and adhesively secured thereto.

The upper edge of the container may be rolled to form a rolled bead 92 in a well known manner, and the bottom of the container can be formed by affixing the bottom disk 93 in a manner analogous to the disk 85 with respect to the cylinder 67 (FIG. 10).

The marginal portions of the laminate which are to be formed into a container can be prepared for the formation of a seam in other ways than those above set forth. For example, as follows:

(1) The application of pressure and a solvent to the polystyrene marginal portions to collapse the cells thereof without heat.

(2) The removal of the foamed polystyrene along such selected marginal portions by the use of a solvent, for example, acting upon a roll which engages such portion and entrains same upon the roll, the polystyrene being removed from the roll as by a doctor blade.

(3) The removal of the foamed polystyrene along the selected margin, for example, by abrasive means.

Referring now to FIG. 11a, a novel seam construction is shown which is formed in accordance with the above numbered paragraphs 2 and 3. Such seam construction is similar to that shown in FIG. 11 with the exception that the solid polystyrene marginal layer 69a is omitted and the bead 81 is not formed. The formation of the bead 81 is the result of the application of heat and does not occur if the marginal polystyrene is removed by a solvent or by abrasion. Thus the seam of FIG. 11a consists of a thickness 94 consisting of a marginal paper layer 95 adhered by an adhesive layer 96 to a thickness 97, the latter being similar to thickness 76 in FIG. 11 and consisting of a paper layer 98 adhered by adhesive 99 to a foamed polystyrene layer 100. Thus paper layer 95 is adhered to paper layer 98. The positioning of the foamed polystyrene which formerly existed along the marginal portion of the lower thickness of the seam of FIG. 11a is indicated in broken lines at 101 and has been previously removed as by a solvent or by abrasion as aforementioned. The balance of such polystyrene layer remains intact as at 102 and is adhered to the paper layer 95. Lefthand face 103 of the polystyrene layer 102 thus serves a function somewhat similar to the bead 81 of FIG. 11 in that it provides a well defined boundary for the positioning of edge 104 of the paper layer 98 and provides between the face 103 and edge 104 a trough 105 which may be filled with adhesive if desired up to the top level of the polystyrene 102 as viewed in FIG. 11, thereby preventing access of liquids to the edge 104 of the paper layer 98.

Referring now to FIG. 14, there is shown a layer of the foamed polystyrene formed as by the extruding apparatus shown in FIG. 1 and having imprinted thereon an image by half-tone printing and illustrating a three dimensional or depth effect obtained by the coaction of the printed image and the polystyrene sheet.

There is thus provided a novel laminate which is particularly well adapted for container or carton constructions with special reference to containing hot drinks.

The novel laminate is also particularly well adapted for half-tone printing due to its degree of recovery after printing and due to the gloss and shine of its skin surface.

The novel laminate is also easily embossable and after undergoing embossing is easily printable because of the yielding and recovering nature of the polystyrene.

Regarding the embossing of the novel laminate, any desired embossing effect can be produced by employing an embossing roll having a surface formed to create such effect. Such roll can be employed as the pressure roll for producing adhesion between the foamed polystyrene sheet and the paper after the adhesive has been applied to one or the other.

The appearance and non-abrasive character of the novel foamed polystyrene adapt same, for example, as the lining for containers, such as jewelry boxes or instrument containers. Its non-abrasive character and extremely high angle of slip make it of high utility as interleaving between polished or easily damaged surfaces, for the packing of polished metal and for the packing of plate glass.

The high printability, cushioning and waterproof properties of the foamed polystyrene sheet also adapt same for many other uses, such as labels for glass containers of chilled liquids. The foamed polystyrene sheet is also of high utility as an interleaf placed between steel surfaces because of its high angle of slip which has been found to be in excess of 60° as between the steel and the foamed polystyrene.

Although the disclosure above set forth is particularly concerned with the lamination of the polystyrene sheet with paper, the invention is not limited thereto, it being possible in separate and non-analogous forms of the invention to bond the foamed polystyrene sheet to other flexible rollable materials, such as metal foil, or cloth, or some other plastic.

Substantially wrinkle-free laminate embodying the present invention can be formed on a commercial scale by means of the apparatus herein disclosed wherein the adhesion between the foamed polystyrene and the paper or other sheet material is accomplished in a smooth wrinkle-free manner.

This application is a division of U.S. Serial No. 581,430, filed April 30, 1956, now Patent No. 2,917,217.

What is claimed is:

1. The method for forming a flexible laminate of foamed polystyrene sheet material adhered to a sheet of organic material, which comprises: extruding foamable polystyrene through a peripherally slotted nozzle to form a seamless tube therefrom while directing a preselected quantity of gas under pressure through an orifice located centrally of said nozzle and interiorly of said seamless tube while the latter is being formed, thus forming an expanded, stretched and inflated tube of foamed, flexible polystyrene sheet of at least several thousandths of an inch in thickness having on its opposite surfaces a continuous integral skin, said polystyrene sheet containing throughout between said skin surfaces a multitude of closed cells; continuously applying pressure to opposite outer sides of said tube to collapse and flatten same at a squeeze zone to bring into engagement opposite interior surfaces of said tube to form two adjacent polystyrene sheets joined along their sides; continuously bonding at least one ply of said sheet of organic material to one of the surfaces of the flattened tube and cutting said tube along opposite edges thereby to make separable said adjacent polystyrene sheets.

2. The method for forming a flexible laminate of foamed polystyrene sheet material adhered to a sheet of organic material having at least one corrugated face which comprises: extruding foamable polystyrene through a peripherally slotted nozzle to form a seamless tube therefrom while directing a preselected amount of a gas under pressure through an orifice located centrally of said nozzle and interiorly of said seamless tube while the latter is being formed, thus forming an expanded, stretched and inflated tube of foamed, flexible polystyrene sheet material at least several thousandths of an inch thick, and having on its opposite surfaces, a continuous integral skin, said polystyrene sheet material containing throughout between said skin surfaces a multitude of closed cells; continuously applying pressure to opposite outer sides of said tube to collapse and flatten same at a squeeze zone to bring into engagement opposite interior surfaces of said tube to form two adjacent sheets of said polystyrene material joined along their sides; continuously bonding a pair of said sheets of organic material to the opposite surfaces, respectively, of the flattened tube, cutting said tube along opposite edges to form separable polystyrene sheets of the resulting laminate, separating said sheets of said polystyrene material and passing same between pressure rolls at least one of which has an embossed face for embossing said sheets.

3. The method according to claim 2 wherein said adjacent sheets of polystyrene sheet material are separated and embossed prior to bonding to said sheets of organic material.

4. The method for forming a flexible laminate of sheet material consisting of a sheet of flexible foamed polystyrene adhered to a flexible sheet of organic material, which comprises: applying heat and pressure at an extruding zone to expandable, foamable polystyrene to expand same while extruding same through a substantially circular extruding slot to form an inflated, stretched, flexible, seamless thin-walled tube consisting of polystyrene of foam consistency while holding gas under pressure within said tube to cause inflation thereof, said tube having on each of its inner and outer surfaces a continuous integral skin, and containing throughout between said skin surfaces a multitude of small closed cells; continuously bringing together at a squeeze zone, opposed portions of said tube while maintaining inflation of the tube between said zones, thereby progressively and continuously flattening said tube into opposed plies at said squeeze zone; and bonding continuously to said plies continuous sheets of said organic material to form a laminate, and subjecting said laminate to embossing pressure.

5. The method according to claim 4 wherein the polystyrene side of said laminate is printed with half-tone printing.

6. The method for forming an article of flexible laminate consisting of a sheet of flexible polystyrene several thousandths of an inch thick and containing throughout a multitude of small closed cells, which sheet is adhered to a sheet of flexible organic sheet material, which comprises: applying heat and pressure at an extruding zone to expandable, foamable, polystyrene while extruding same in the form of an inflated, flexible, seamless tube while holding gas under pressure in said tube to cause inflation thereof; continuously collapsing said tube to bring together the opposed interior surfaces thereof at a squeeze zone while maintaining inflation of said tube between said zones and while continuously bonding to at least one of the surfaces of the collapsed tube a continuous web of said sheet of organic material to form said laminate; collapsing the said closed cells along selected marginal portions of said laminate to form thereat substantially solid polystyrene.

7. The method for forming a flexible laminate of foamed polystyrene sheet material adhered to a sheet of flexible material, which comprises: extruding foamable polystyrene in the form of a seamless tube while maintaining interiorly of said tube gas under pressure sufficient to inflate the same to the extent of imparting thereto a wall thickness of several thousandths of an inch and containing throughout a multitude of small closed cells of the order of .002″ to .006″ in diameter; collapsing said tube at a squeeze zone to bring into engagement opposite interior surfaces thereof thus forming two adjacent sheets of said foamed polystyrene sheet material joined along their sides; and bonding said sheet of flexible material to at least one of the surfaces of said polystyrene sheet material by pressing to form said laminate.

8. The method for forming a flexible laminated article of foamed polystyrene sheet material adhered to a paper sheet, which comprises: progressively extruding foamable polystyrene at an extrusion zone in the form of a continuous seamless tube while maintaining interiorly of said tube gas under pressure sufficient to inflate said tube to a thin and flexible wall thickness; continuously collapsing said tube at a squeeze zone spaced from said extrusion zone, to bring into engagement opposite interior surfaces thereof thus forming two adjacent sheets of the extruded foamed polystyrene material; and continuously bonding a continuous flexible paper sheet to at least one surface of said two adjacent sheets.

9. The method of forming a container of flexible laminated sheet material consisting of a flexible sheet of foamed polystyrene several thousandths of an inch thick and containing throughout a multitude of small closed cells, which sheet is adhered to a sheet of flexible paper; said method comprising: forming from said laminated sheet material a strip adapted to be formed into a container; applying heat and pressure to collapse said closed cells along selected marginal portions of said strip, said heat and pressure forming substantially fused solid polystyrene; and forming said strip into a container by bonding said selected marginal portions to other marginal portions of the said flexible laminated sheet material.

10. In a method of forming a container from a flexible laminate consisting of a flexible sheet of foamed polystyrene several thousandths of an inch thick and containing a multitude of closed cells, which sheet is adhered to a sheet of flexible paper; the steps comprising: forming from said laminate a strip adapted to be formed into a cylinder; applying heat and pressure to collapse said closed cells and form substantially fused solid polystyrene along selected marginal portions of said strip, and winding said strip helically into cylindrical form and bonding said selected marginal portions bearing said solid polystyrene to other marginal portions.

11. In a method for forming a container as set forth in claim 10, the step including the winding of said strip helically into cylindrical form with the foamed polystyrene side thereof facing interiorly thereof.

References Cited in the file of this patent
UNITED STATES PATENTS

| | | |
|---|---|---|
| 2,047,554 | Fischer | July 14, 1936 |
| 2,315,217 | Obiglio | Mar. 30, 1943 |
| 2,341,979 | Cunnington | Feb. 15, 1944 |
| 2,452,080 | Stephenson | Oct. 26, 1948 |
| 2,477,300 | Karfiol et al. | July 26, 1949 |
| 2,537,977 | Dulmage | Jan. 16, 1951 |
| 2,555,380 | Stuart et al. | June 5, 1951 |
| 2,669,751 | McCurdy et al. | Feb. 23, 1954 |
| 2,722,719 | Altstadter | Nov. 8, 1955 |
| 2,739,093 | Bull | Mar. 20, 1956 |
| 2,750,631 | Johnson | June 19, 1956 |
| 2,768,902 | Scholl | Oct. 30, 1956 |
| 2,770,406 | Lane | Nov. 13, 1956 |
| 2,815,043 | Kleiner et al | Dec. 3, 1957 |
| 2,832,994 | Ahlich et al. | May 6, 1958 |
| 2,865,046 | Bird | Dec. 23, 1958 |
| 2,872,965 | Sisson | Feb. 10, 1959 |
| 2,977,639 | Barkhuff et al. | Apr. 4, 1961 |

FOREIGN PATENTS

| | | |
|---|---|---|
| 842,267 | Germany | Sept. 15, 1952 |
| 1,082,852 | France | June 23, 1954 |

OTHER REFERENCES

Plastics, "Expanded and Foamed Materials," August 1953, pp. 274–277.